US012403067B2

(12) United States Patent
Coon et al.

(10) Patent No.: US 12,403,067 B2
(45) Date of Patent: Sep. 2, 2025

(54) REMOTE HOT TUB CONTROL SYSTEM

(71) Applicants: Jeremy John Coon, Bend, OR (US); Carsen Finn O'Neill, Bend, OR (US)

(72) Inventors: Jeremy John Coon, Bend, OR (US); Carsen Finn O'Neill, Bend, OR (US)

( * ) Notice: Subject to any disclaimer, the term of this patent is extended or adjusted under 35 U.S.C. 154(b) by 336 days.

(21) Appl. No.: 17/816,331

(22) Filed: Jul. 29, 2022

(65) Prior Publication Data

US 2023/0034536 A1 Feb. 2, 2023

Related U.S. Application Data

(60) Provisional application No. 63/227,289, filed on Jul. 29, 2021.

(51) Int. Cl.
*A61H 33/00* (2006.01)

(52) U.S. Cl.
CPC ....... *A61H 33/005* (2013.01); *A61H 33/6068* (2013.01); *A61H 2033/0058* (2013.01)

(58) Field of Classification Search
CPC .............. A61H 33/005; A61H 33/6068; A61H 2033/0058
See application file for complete search history.

(56) References Cited

U.S. PATENT DOCUMENTS

| | | | | |
|---|---|---|---|---|
| 2008/0039977 A1* | 2/2008 | Clark | G05D 23/1905 700/282 |
| 2009/0178192 A1* | 7/2009 | Vassilev | G05D 23/1393 4/668 |
| 2014/0059759 A1* | 3/2014 | DuHack | A61H 33/6078 4/494 |
| 2015/0257973 A1* | 9/2015 | Beyer | A61H 33/0087 4/541.1 |
| 2016/0041565 A1* | 2/2016 | Edwards | G01M 3/00 700/282 |
| 2018/0280232 A1* | 10/2018 | Hung | B08B 9/0323 |
| 2019/0099325 A1* | 4/2019 | Ovalle | A61H 33/005 |

* cited by examiner

*Primary Examiner* — Zhipeng Wang
(74) *Attorney, Agent, or Firm* — Alleman Hall & Tuttle LLP

(57) ABSTRACT

A remote hot tub control system for a hot tub includes a controller and an input device. The controller is configured to execute a draining and filling cycle of the hot tub. Upon receiving a user command at the input device to initiate the cycle, the controller commands an output valve to open and a water pump to pump used water out of the hot tub via the output valve. Upon receiving a first signal indicating that the hot tub has been drained of the used water, the controller commands the output valve to close, the water pump to stop pumping, and an input valve to open to permit fresh water to enter the hot tub. Upon receiving a second signal indicating that the hot tub has been filled, the controller commands the input valve to close.

18 Claims, 5 Drawing Sheets

REMOTE HOT TUB CONTROL SYSTEM

CROSS REFERENCE TO RELATED APPLICATIONS

The present application is based upon and claims priority under 35 U.S.C. 119(e) to U.S. Provisional Patent Application No. 63/227,289, entitled REMOTE HOT TUB CONTROL SYSTEM, filed Jul. 29, 2021, the entirety of which is hereby incorporated herein by reference for all purposes.

BACKGROUND

Hot tubs need to be drained and refilled several times each year for maintenance, as well as whenever the water quality is compromised. The task of changing the water in a hot tub is time-consuming and messy, which often leads many hot tub owners to delay performing the maintenance. Such a lack of maintenance may contribute to a decrease in the integrity and lifespan of the hot tub, as well as potential health risks due to poor water quality. A challenge exists in designing a simple and efficient way to remotely control the draining and refilling of a hot tub.

SUMMARY

To address the above issues, a remote hot tub control system and method of use therefor are disclosed herein. According to a first aspect, a remote hot tub control system may include a controller and an input device. The remote hot tub control system may be implemented with a hot tub connected to a drain line with an output valve configured to control an egress of used water from the hot tub, a water pump configured to pump water out of the hot tub via the drain line, and a fill line having an input valve to control an ingress of fresh water to the hot tub. The controller may be configured to execute a draining and filling cycle of the hot tub, and the input device may be in communication with the controller and configured to receive user commands. The input device and the controller may communicate via a wireless or wired network. The controller may be electronically connected to the output valve, water pump, and input valve. Upon receiving a user command at the input device to execute the draining and filling cycle of the hot tub, the controller may be configured to command the output valve to open and command the water pump to pump the used water out of the hot tub via the output valve. The controller may be further configured to receive a first signal from a signal source indicating that the hot tub has been drained of the used water, and in response thereto, command the output valve to close, command the water pump to stop pumping, and command the input valve to open to permit the fresh water to enter the hot tub. The controller may be further configured to receive a second signal from the signal source indicating that the hot tub has been filled, and in response thereto, command the input valve to close. A potential benefit of this configuration is that hot tub maintenance can be simplified and more convenient with the ability to initiate a draining and filling cycle of a hot tub from a remote location. Additionally, manual changes of the hot tub water can be reduced or eliminated, expensive third-party hot tub servicing and maintenance fees can be avoided, and periodic draining and filling cycles of the hot tub can be programmed according to a maintenance schedule to prolong the lifespan of the hot tub.

In this aspect, the signal source may be a water level sensor electronically coupled to the controller and configured to detect a water level of the hot tub and output the first signal and the second signal. The controller may transmit a command to close the output valve upon receiving the first signal from the water level sensor indicating that the hot tub has been drained of the used water. The controller may transmit a command to close the input valve upon receiving the second signal from the water level sensor indicating that the hot tub has been filled with the fresh water. Potential benefits of this configuration are that the hot tub can be completely drained, and overfilling or underfilling the hot tub can be prevented.

In this aspect, the signal source may be a timer included in the controller and configured to measure a predetermined drain time and a predetermined fill time. The controller may transmit a command to close the output valve upon receiving the first signal from the timer indicating that the predetermined drain time has elapsed. The controller may transmit a command to close the input valve upon receiving the second signal from the timer indicating that the predetermined fill time has elapsed. Potential benefits of this configuration are that the hot tub can be completely drained, and overfilling or underfilling the hot tub can be prevented.

In this aspect, the system may further include at least one water quality sensor electronically coupled to the controller. The at least one water quality sensor may be configured to detect a condition of water in the hot tub and transmit a quality signal to the controller indicating the condition of the water. A potential benefit of this configuration is that a user may be alerted when it is necessary to initiate a draining and refilling cycle of a hot tub due to poor water quality.

In this aspect, the system may further include a water temperature sensor electronically coupled to the controller. The water temperature sensor may be configured to detect a water temperature of water in the hot tub and transmit a water temperature signal to the controller indicating the water temperature. A potential benefit of this configuration is that a user may be informed if the water temperature of the hot tub is above or below a threshold value, which may indicate when the temperature of the water in the hot tub has reached a value suitable for use after a draining and refilling cycle.

In this aspect, the system may further include a temperature sensor arranged on a heating coil of the hot tub and configured to transmit a coil temperature signal to the controller when the heating coil is active and heating fresh water after the hot tub has been filled. A potential benefit of this configuration is that the temperature of the fresh water can be tracked as it is heating, which may indicate whether the heating coil is functioning properly.

In this aspect, the system may further include at least one additive pump configured to pump at least one additive into the fresh water in the hot tub under the control of the controller. A potential benefit of this configuration is that a quality of the water in the hot tub can be adjusted automatically and/or remotely via the controller.

In this aspect, upon receiving the command to execute the draining and filling cycle of the hot tub, the controller may be configured to interrupt a flow of electricity to a native hot tub power supply. Potential benefits of this configuration are that risk of electrical shock and/or damage can be reduced, and electronic components of the hot tub can be prevented from running when the hot tub is empty, thereby prolonging their lifespans.

In this aspect, upon receiving the second signal indicating that the hot tub has been filled, the controller may be configured to restore a flow of electricity to a native hot tub power supply of the hot tub. A potential benefit of this configuration is that the hot tub may be automatically readied for use after the draining and refilling cycle is complete.

In this aspect, the system may further include a safety switch electronically coupled to the controller. The safety switch may be configured to detect a state of a cover of the hot tub and send a safety signal to the controller when the cover is in an open state. Upon receiving the safety signal indicating that the cover is in the open state, the controller may be configured to pause execution of the draining and filling cycle of the hot tub. A potential benefit of this configuration is that draining the hot tub may be prevented when the hot tub is in use.

In another aspect, a method of use for a remote hot tub control system is provided. The method may include connecting a controller to a hot tub and configuring the controller to execute a draining and filling cycle of the hot tub. The method may further include configuring an input device to be in communication with the controller. As described above, the input device and the controller may communicate via a wireless or wired network. The input device may be configured to receive user commands. The method may further include inputting, via the input device, a command to execute the draining and filling cycle of the hot tub. Upon receiving a user command at the input device to execute the draining and filling cycle of the hot tub, the controller may be configured to command the output valve to open and command the water pump to pump the used water out of the hot tub via the output valve. The controller may be further configured to receive a first signal from a signal source indicating that the hot tub has been drained of the used water, and in response thereto, command the output valve to close, command the water pump to stop pumping, and command the input valve to open to permit the fresh water to enter the hot tub. The controller may be further configured to receive a second signal from the signal source indicating that the hot tub has been filled, and in response thereto, command the input valve to close. A potential benefit of this configuration is that hot tub maintenance can be simplified and more convenient with the ability to initiate a draining and filling cycle of a hot tub from a remote location. Additionally, manual changes of the hot tub water can be reduced or eliminated, expensive third-party hot tub servicing and maintenance fees can be avoided, and periodic draining and filling cycles of the hot tub can be programmed according to a maintenance schedule to prolong the lifespan of the hot tub.

In another aspect, a remote hot tub control system may include an input device and a plurality of controllers. The remote hot tub control system may be configured for use with a plurality of hot tubs, each hot tub being connected to a respective drain line with an output valve configured to control an egress of used water from the hot tub, a water pump configured to pump water out of the hot tub via the drain line, and a fill line having an input valve to control an ingress of fresh water to the hot tub. The input device may be configured to receive user commands, and each controller of the plurality of controllers may be electronically connected to the output valve, water pump, and input valve of a respective hot tub of the plurality of hot tubs. Upon receiving a user command at the input device to execute the draining and filling cycle of the hot tub to which it is connected, each controller may be configured to command the output valve to open and command the water pump to pump the used water out of the hot tub via the output valve. Each controller may be further configured to receive a first signal from a signal source indicating that the hot tub has been drained of the used water, and in response thereto, command the output valve to close, command the water pump to stop pumping, and command the input valve to open to permit the fresh water to enter the hot tub. Each controller may be further configured to receive a second signal from the signal source indicating that the hot tub has been filled, and in response thereto, command the input valve to close. A potential benefit of this configuration is that maintenance schedules of multiple hot tubs can be easily and conveniently controlled by a single entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

First Embodiment

Figure 1A:
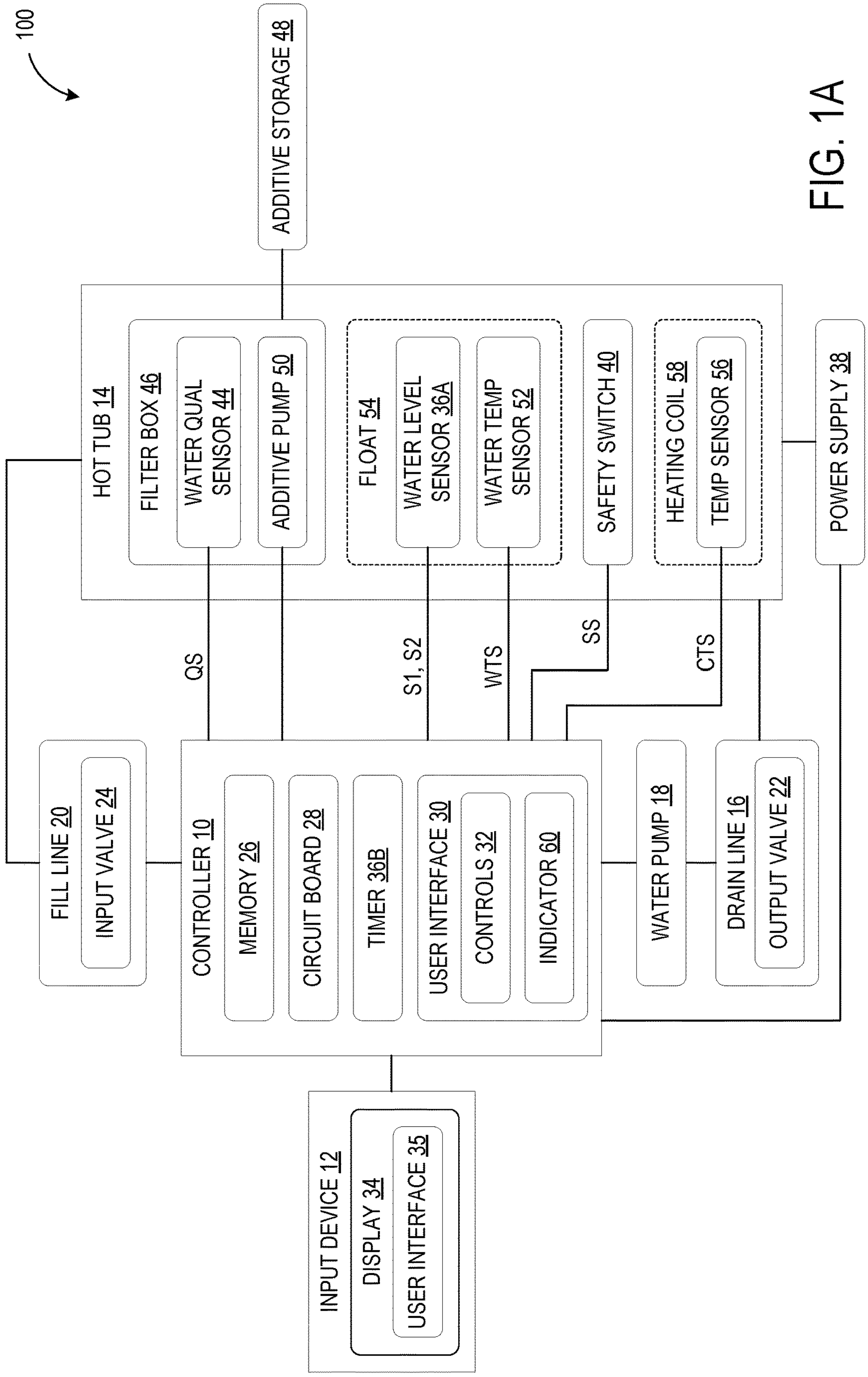
FIG. 1A shows a schematic diagram of a remote hot tub control system according to one embodiment of the present description.
Figure 1B:
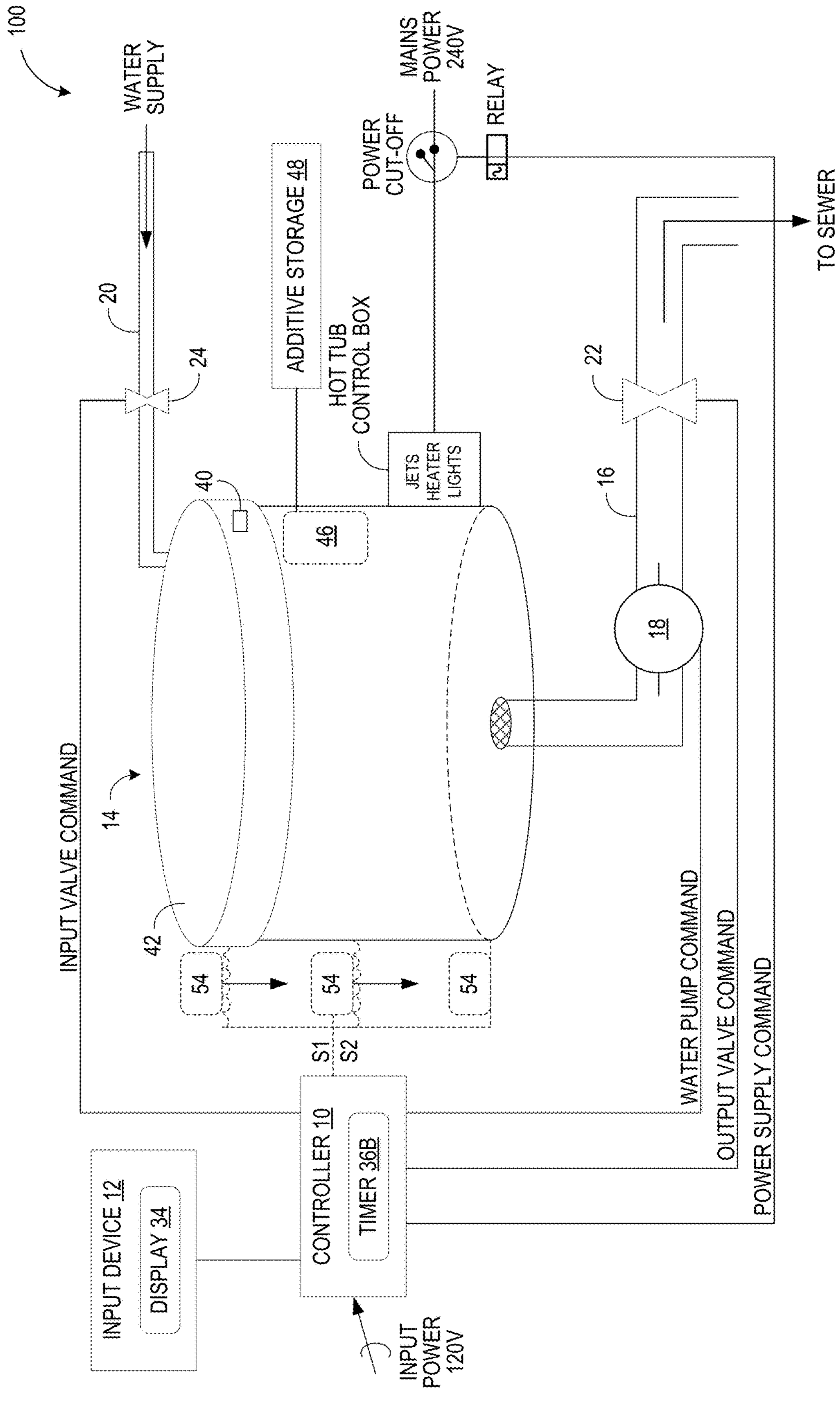
FIG. 1B shows a schematic illustration of the remote hot tub control system according to FIG. 1A.

Turning to the figures, FIG. 1A shows a schematic diagram of a remote hot tub control system 100 according to one embodiment of the present description, and FIG. 1B is a schematic illustration of the remote hot tub control system 100. It will be appreciated that the features and elements of the first embodiment of the remote hot tub control system 100 are described herein with reference to FIGS. 1A and 1B.

The remote hot tub control system 100 may comprise a controller 10 and an input device 12, which may be used to remotely control draining and filling a hot tub. As such, the remote hot tub control system 100 may be configured for use with a hot tub 14 connected to a drain line 16, a water pump 18, and a fill line 20. The drain line 16 may have an output valve 22 to control an egress of used water from the hot tub 14, and the water pump 18 may be configured to pump water out of the hot tub 14 via the drain line 16. The fill line 20 may have an input valve 24 to control an ingress of fresh water to the hot tub 14. It will be appreciated that the drain line 16 may be configured as a drain hose that may be permanently or removably connected to the hot tub 14. Similarly, the fill line 20 may be configured as a fresh water source that may be permanently or removably connected to the hot tub 14.

The controller 10 may be configured to execute a draining and filling cycle of the hot tub 14. Accordingly, the controller 10 may include a memory 26 and a circuit board 28 configured to store and coordinate the draining and filling cycle of the hot tub 14. The controller 10 may be electronically connected to the output valve 22, water pump 18, and input valve 24, which may be automated such that they can be controlled by the controller 10. A user interface 30 including manual controls 32 may further be included in the controller 10 to permit a user to manually control or override the system 100 if necessary.

The input device 12 may be in communication with the controller 10 and configured to receive user commands. As described in detail below with reference to FIG. 3, the user commands may be entered to the input device 12 via a user interface 35 of a remote hot tub control application 300 presented on a display 34 of the input device 12. Additionally, the user may view the status and parameters of the hot tub 14 detected by the remote hot tub control system 100 via the remote hot tub application. Accordingly, the input device 12 may be implemented as an electronic computing device configured to store and execute the remote hot tub control application 300, such as a desktop computer or a mobile computing device, which may take the form of a smart phone device, a tablet computing device, a wrist mounted computing device, or the like. It will be appreciated that the input device 12 and the controller 10 may communicate via a wireless telephone network, or a wired or wireless local- or wide-area network, such as a HDMI over Wi-Fi connection.

The controller 10 may be configured to drain and fill the hot tub 14 according to a predetermined schedule input by the user. Additionally or alternatively, the controller may be configured to notify the user if a predetermined time threshold for draining and filling the hot tub is approaching and/or if a draining and filling cycle is needed due to poor water quality or the like, as described in detail below. Such notifications may be delivered to the user in the form of a text message or email, for example. It will be appreciated that the user may also initiate the draining and filling cycle at any time.

Upon receiving a user command at the input device 12 to execute the draining and filling cycle of the hot tub 14, the controller 10 may be configured to command the output valve 22 to open and command the water pump 18 to pump the used water out of the hot tub through the drain line 16 via the output valve 22.

The controller 10 may receive a first signal S1 from a signal source 36 indicating that the hot tub 14 has been drained of the used water. Upon receiving the first signal S1, the controller 10 may be configured to command the output valve 22 to close, command the water pump 18 to stop pumping, and command the input valve 24 to open to permit the fresh water to enter the hot tub 14 via the fill line 20. The controller 10 may receive a second signal S2 from the signal source 36 indicating that the hot tub 14 has been filled with fresh water. In response to receiving the second signal S2, the controller 10 may be configured to command the input valve 24 to close.

The signal source 36 may be configured as a water level sensor 36A electronically coupled to the controller 10. The water level sensor 36A may be configured to detect a water level of the hot tub 14 and output the first signal S1 and the second signal S2. As described above, the controller 10 may transmit a command to close the output valve 22 upon receiving the first signal S1 from the water level sensor 36A indicating that the hot tub 14 has been drained of the used water and transmit a command to close the input valve 24 upon receiving the second signal S2 from the water level sensor 36A indicating that the hot tub 14 has been filled with the fresh water. Additionally or alternatively, the controller 10 may include a timer 36B, which may serve as the signal source 36. As such, the timer 36B may be configured to measure a predetermined drain time and a predetermined fill time and output the first signal S1 and the second signal S2. Additionally or alternatively, the drain line 16 could be configured to include a flow meter inline with the outlet valve 22 to measure a volume of water that flows out of the hot tub 14 during the drain cycle to determine when the hot tub 14 has been drained of the used water.

To reduce the risk of electric shock and avoid damage to the hot tub, it is important to turn off power to the hot tub prior to draining. As such, upon receiving the command to execute the draining and filling cycle of the hot tub 14, the controller 10 may configured to interrupt a flow of electricity to a native hot tub power supply 38, such as 240V supplied from utility power, for example. Upon receiving the second signal S2 indicating that the hot tub 14 has been filled, the controller 10 may be configured to restore the flow of electricity to the native hot tub power supply 38 of the hot tub 14. It will be appreciated that the controller 10 may be configured to include an inlet for receiving power input at 120V separately from the native hot tub power supply 38 such that the controller is connected to a power supply when the flow of electricity to the native hot tub power supply 38 is interrupted.

Additionally, the remote hot tub control system 100 may include a safety switch 40 electronically coupled to the controller 10. The safety switch 40 may be configured to detect a state of a cover 42 of the hot tub 14 and send a safety signal SS to the controller 10 when the cover 42 is in an open state. For example, the safety switch 40 may be implemented as a two-part magnetic switch comprising a magnet and a magnetically sensitive switch. The magnetic switch may be installed with one part attached to the cover and the other part attached to an upper portion of the hot tub 14 such that the magnetically sensitive switch does not detect the magnetic field of the magnet when the cover 42 is open or removed, thereby triggering transmission of the safety signal SS to the controller 10. Upon receiving the safety signal SS indicating that the cover 42 is in the open state, the controller 10 may be configured to pause execution of the draining and filling cycle of the hot tub 14 to avoid draining the hot tub 14 when it is in use. As an additional safety feature, the drain and refill features can be manually turned off at the controller 10, as described above with reference to the manual controls 32.

As mentioned above, the controller 10 may be configured to notify the user if a draining and filling cycle is needed due to poor water quality or the like. To this end, the remote hot tub control system 100 may include at least one water quality sensor 44 electronically coupled to the controller 10. The at least one water quality sensor 44 may be configured to detect a condition of water in the hot tub 14 and transmit a quality signal QS to the controller 10 indicating the condition of the water. The controller 10 may be configured to notify the user when one or more indicators of water quality reach a predetermined threshold, and the user may initiate a drain and fill cycle for the hot tub 14 based on the notification. Additionally or alternatively, the controller 10 may be configured to automatically execute a drain and fill cycle when one or more indicators of water quality reaches a predetermined threshold.

The water quality sensor 44 may be implemented as a pH meter, an oxidation reduction potential (ORP) meter, a dissolved oxygen (DO) sensor, or the like. It will be appreciated that the remote hot tub control system 100 may include one or several water quality sensors 44. The sensor probes for each sensor may be mounted through a lid of a water filter cover arranged in a filter box 46 of the hot tub 14. The water quality may be adjusted by the addition of additives. For example, pH values of the water may be monitored and regulated by the addition of liquid pH adjustment reagents to the water, and the sterile environment of the water in the hot tub 14 and the ORP may be controlled with chemicals such as bromine, chlorine, or iodine. The additives, i.e., pH reagents and chemicals, may be stored in an additive storage unit 48 proximate to the hot tub 14, and at least one additive pump 50 may be configured to pump at least one additive into the fresh water in the hot tub 14 under the control of the controller 10. The additive pump 50 may be implemented as a peristaltic pump arranged in the filter box 46 and configured to pump additives through a water line of the hot tub 14. Additionally or alternatively, the pH reagents and/or chemicals may be dripped directly into water in the hot tub 14 via a separate small diameter tube. The amount of dissolved oxygen in the water may be regulated via a conventional ozonator kit under the control of the controller 10.

It may be desirable to keep a temperature of the water in the hot tub 14 within a predetermined range to prevent microbial growth and/or maximize the comfort of the user. To this end, the remote control system 100 may include a water temperature sensor 52 electronically coupled to the controller 10. The water temperature sensor 52 may be configured to detect a water temperature of the water in the hot tub 14 and transmit a water temperature signal WTS to the controller 10 indicating the water temperature. The water temperature sensor 52 may be implemented as a thermometer included in a float 54, for example. In this configuration, the float 54 may also include the water level sensor 36A described above.

The remote hot tub control system 100 may further include a temperature sensor 56 to indicate when fresh water is heating after the hot tub 14 has been filled. As such, the temperature sensor 56 may be arranged on a heating coil 58 of the hot tub and configured to transmit a coil temperature signal CTS to the controller 10 when the heating coil 58 is actively heating the water.

It will be appreciated that any or all of the water level sensor 36A, one or more water quality sensors 44, water temperature sensor 52, and temperature sensor 56 described herein may be configured to continuously monitor respective conditions of the hot tub 14 and water in the hot tub 14. Values detected by one or more of the sensors may be presented to the user in graph form on the display 34 of the input device 12, thereby allowing the user to remotely track and control the water quality of the water in the hot tub 14 via the controller 10 of the remote hot tub control system 100.

To inform hot tub users of the status of the remote hot tub control system 100, the user interface 30 on the controller 10 may include a status indicator 60, which may be implemented as one or more LED lights. The status indicator 60 may be capable of different display modes to indicate the current operational condition of the system 100. For example, the system 100 may be on standby while the hot tub is in use, and the status indicator 60 may display a steady green light. As described above, the safety switch 40 is configured to send the safety signal SS to the controller 10 when the cover 42 of the hot tub 14 is removed, indicating that the hot tub 14 is currently in use. When the system 100 may be running under normal operation and the hot tub 14 is not in use, the status indicator 60 may display a flashing green light. A flashing green light and a steady red light may indicate that the system 100 is actively draining or filling the hot tub 14. The status indicator 60 may be configured to display different colors or modes to indicate water quality issues, such as when the pH level is too low or too high, for example.

Second Embodiment

Figure 2:
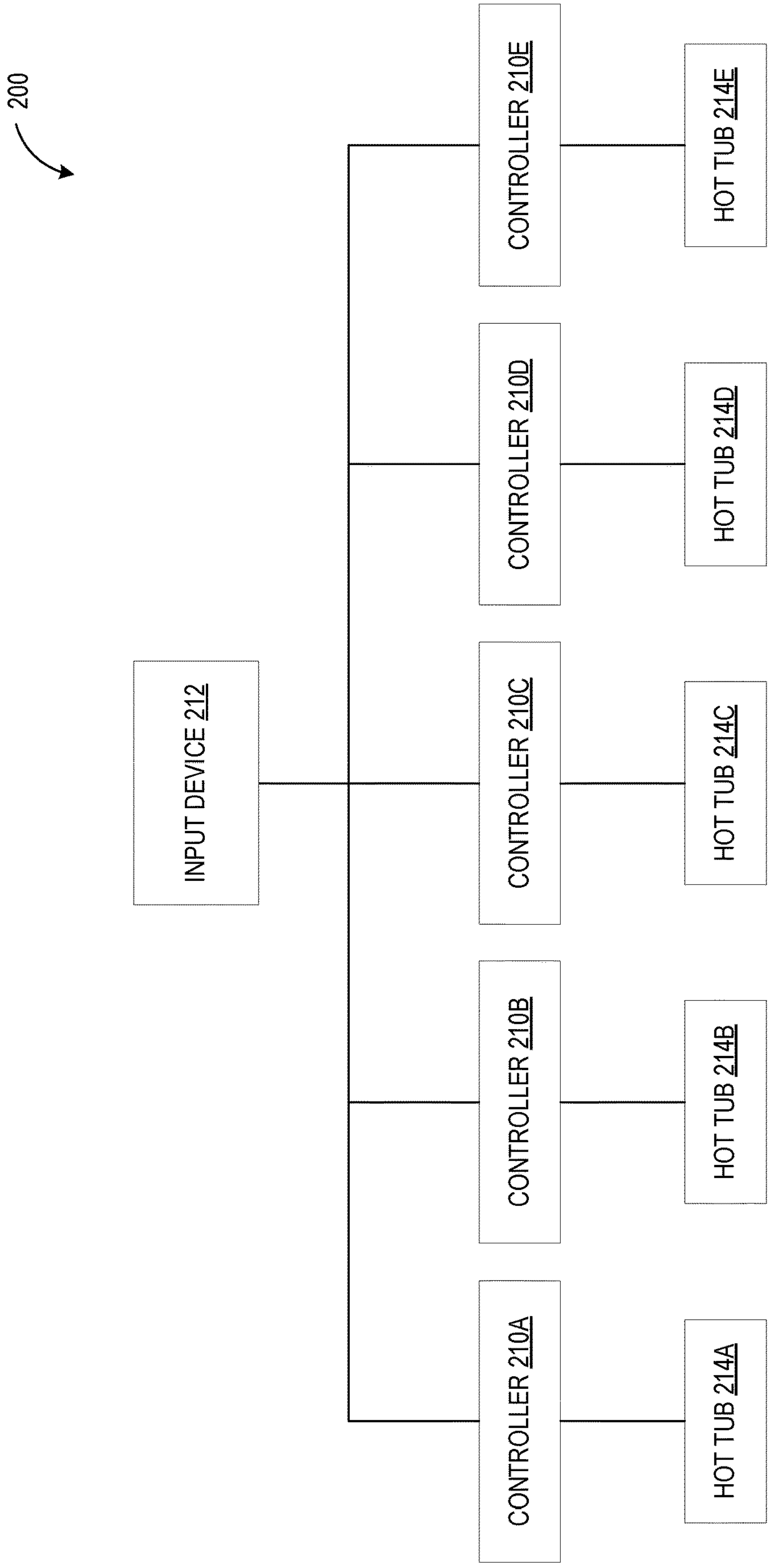
FIG. 2 shows a schematic diagram of a remote hot tub control system according to another embodiment of the present description.

Looking now at FIG. 2, a second embodiment of a remote hot tub control system 200 is illustrated. As the remote hot tub control system 200 according to the second embodiment is generally similar to that of the remote hot tub control system 100 according to the first embodiment, the detailed description thereof is abbreviated for the sake of coherence. It is to be noted that like parts are designated by like reference numerals throughout the detailed description and the accompanying drawings.

In some use-case scenarios, it may be desirable to remotely control draining and filling cycles for a plurality of hot tubs 14. Accordingly, the remote hot tub control system 200 comprises an input device 212 and a plurality of controllers 210 in communication with the input device 212. Each controller 210 of the plurality of controllers 210 may be connected to a respective hot tub 214 of the plurality of hot tubs. Each hot tub 214 may be configured similarly to the hot tub 14 described above with reference to the first embodiment.

In the example remote hot tub control system 200 shown in FIG. 2, five controllers 210A-210E are each connected to a respective hot tub 214A-214E. However, it will be appreciated that the number of controllers 210 and hot tubs 214 in the remote hot tub control system 200 may be more or fewer than five. Upon receiving a user command at the input device 212 to execute a draining and filling cycle of the hot tub 214 to which it is connected, each controller 210 is configured to execute a draining and filling cycle of the hot tub 214, as described above with reference to the first embodiment and FIGS. 1 and 2. As such, one or more users may remotely control the draining and filling cycles of a plurality of hot tubs 214 via a plurality of respective controllers 210 with a single input device 212. This embodiment may be particularly useful for hot tub maintenance service providers, hotels, rental property management companies with multiple properties having hot tubs, or the like, for example.

Figure 3A:
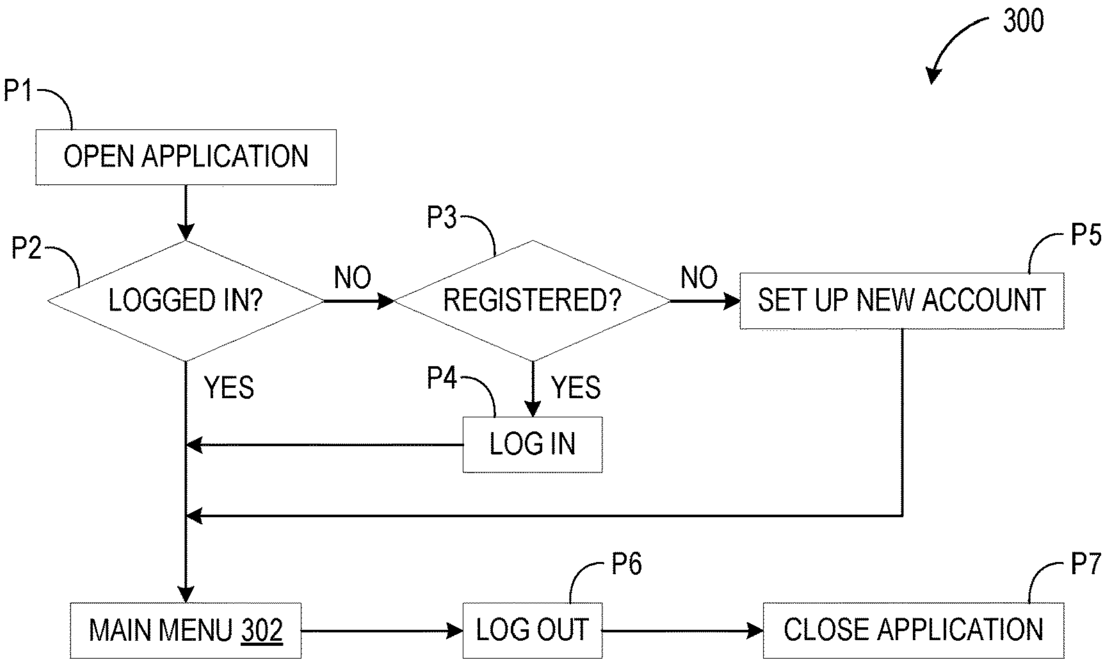
FIG. 3A shows a flowchart for accessing the main menu of a remote hot tub control application, according to one embodiment of the present description.

In any of the embodiments described herein, the system 100, 200 may be operated via a remote hot tub control application 300 installed on the input device 12. FIG. 3A shows a flowchart of prompts and actions for accessing the main menu 302 of the remote hot tub control application 300 such that the remote hot tub control system 100 can be remoted operated by a user. As described above, the remote hot tub control application 300 may executed by the input device 12, and a user interface may be displayed on the display 34 of the input device 12. Upon opening the remote hot tub control application 300 (P1), it may be determined whether the user is logged in to the remote hot tub control application 300 (P2). If the user is logged in, the main menu 302 is displayed. If the user is not logged in, it may be determined whether the user is a registered user of the remote hot tub control application 300, i.e., if the user has an account associated with a remote hot tub control system 100 (P3). If the user is registered, the system may receive user input to log in the user, and the system may navigate to the main menu 302 (P4). If the user is not registered, the system may prompt the user to set up a new account (P5). Upon setting up the account, the system may automatically log the user in, and display the main menu 302. When the user is finished navigating the main menu 302, they may request the system to log out (P6) and close the remote hot tub control application 300 (P7).

Figure 3B:
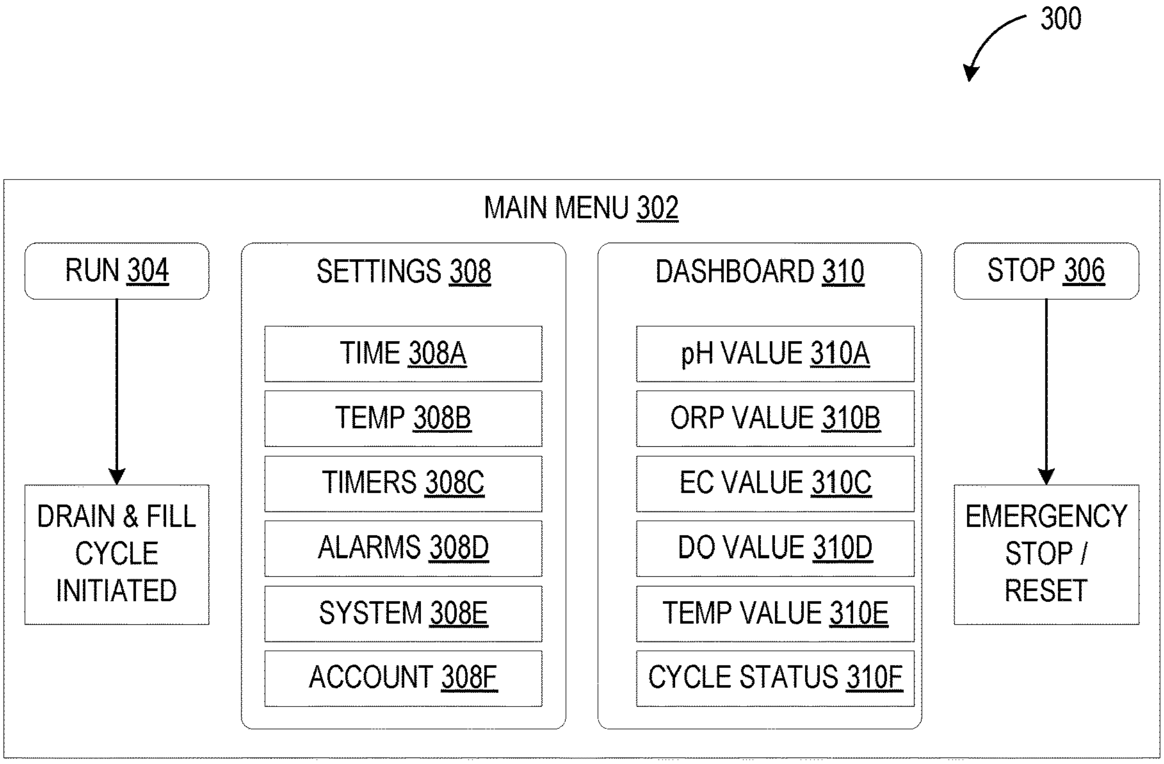
FIG. 3B shows a main menu of a hot tub control application, according to one embodiment of the present description.

The main menu 302 of the hot tub control application 300 is illustrated in FIG. 3B. The main menu 302 may include commands 304, 306 such as "RUN" and "STOP," respectively, as well as tabs for a settings menu 308 and dashboard menu 310. When the user selects the RUN command 304, a drain and fill cycle may be initiated for the hot tub 14 associated with the user account. Selection of the STOP command 306 may cause an emergency stop of an active drain and fill cycle and/or reset the controller 10.

Selection of the settings menu 308 may allow the user to access and change various settings for the remote hot tub control system 100. For example, the settings menu 308 may include categories for configuring the time of day 308A and water temperature 308B. Timers 308C associated with controlling the remote hot tub system 100 may be set, added, and/or deleted. Alarms 308D may alert the user when a value is outside of a specified range, such as pH value, ORP value, electric conductivity (EC) value, DO value, temperature value, or when an error with a cycle status is detected. System settings 308E may be configured to specify parameters of the hot tub 14 controlled by the remote hot tub control system 100, such as a frequency of drain and fill cycles, flow rate in gallons per minute (GPM) of the water during draining and/or filling the hot tub 14, and volume of water, for example. Information pertaining to the hot tub 14, such as make, model, manufacture date, serial number, and the like may also be included in the system settings 308E. Account settings 308F may be used to configure registered user information, change or reset account passwords, and add or delete hot tubs 14 associated with the remote hot tub control system 100 and controlled via the remote hot tub control application 300.

The dashboard menu 310 allows the user to view real-time values of parameters of the hot tub 14 detected by sensors included the remote hot tub control system 100. For example, the dashboard menu 310 may display the pH value 310A, the ORP value 310B, the EC value 310C, the DO value 310D, and the temperature value 310E, as well as a status 310F of the drain and fill cycle. In some configurations, the dashboard menu 310 also includes historic data for the values 310A-310E. As described above, real-time and/or historic data values from one or more of the sensors may be presented to the user in graph form in the user interface 35 displayed on the display 34 of the input device 12.

It will be appreciated that the above description and elements of the remote hot tub control application 300 are intended to be exemplary in nature and not limiting to the disclosure. In any of the embodiments described herein, there may be more or fewer commands and/or tabs within the main menu 302, as well as more or fewer categories within the settings menu 308 and the dashboard menu 310. Additionally, when the remote hot tub control system 200 comprises a plurality of controllers 210 connected to respective hot tubs 214, the remote hot tub control application 300 may be configured to such that each controller 210 has a respective main menu 302, thereby enabling the user to control each controller 210 and its respective hot tub 214 via the remote hot tub control application 300.

Figure 4:
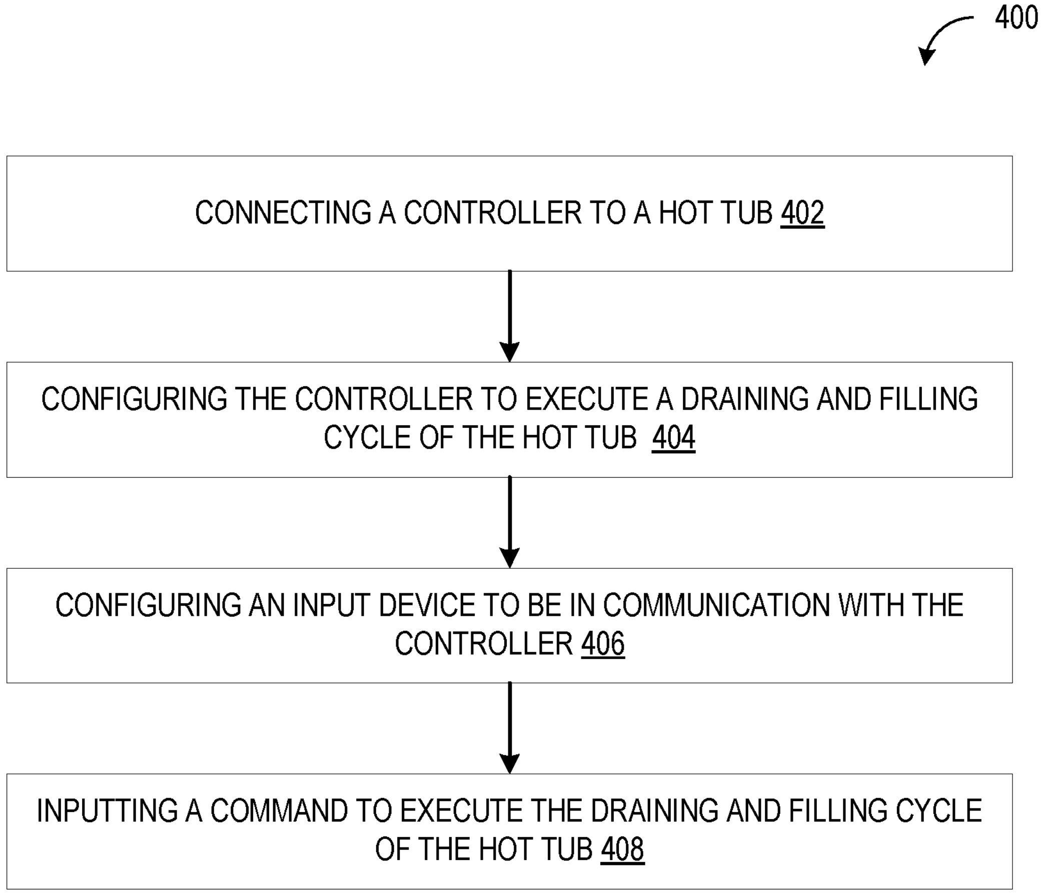
FIG. 4 shows a flowchart of a method of use for a remote hot tub control system according to one embodiment of the present description.

FIG. 4 shows a flowchart of a method 400 of use for a remote hot tub control system 100. As described in detail above, the remote hot tub control system 100 is configured for use with a hot tub 14 that includes a drain line 16, a water pump 18, and a fill line 20.

At step 402, the method 400 may include connecting a controller to a hot tub. As described above, the controller may be implemented for remotely controlling draining and filling cycles of the hot tub. The hot tub may be connected to a drain line having an output valve configured to control an egress of used water from the hot tub, a water pump configured to pump water out of the hot tub via the drain line, and a fill line having an input valve configured to control an ingress of fresh water to the hot tub.

Proceeding from step 402 to step 404, the method 400 may further include configuring the controller to execute a draining and filling cycle of the hot tub. Accordingly, the controller may include a memory and a circuit board configured to store and coordinate the draining and filling cycle of the hot tub. The controller may be electronically connected to the output valve, water pump, and input valve, which may be automated such that they can be controlled by the controller. The controller may be configured to drain and fill the hot tub according to a predetermined schedule input by the user. Additionally or alternatively, the controller may be configured to notify the user if a predetermined time threshold for draining and filling the hot tub is approaching and/or if a draining and filling cycle is needed due to poor water quality or the like.

Continuing from step 404 to step 406, the method 400 may include configuring an input device to be in communication with the controller. As described above, the input device and the controller may communicate via a wireless or wired network. The input device may be configured to receive user commands for controlling the remote hot tub control system. Accordingly, the input device may be implemented as an electronic computing device configured to receive user input, such as a desktop computer or a mobile computing device, which may take the form of a smart phone device, a tablet computing device, a wrist mounted computing device, or the like. The input device may include a display by which a user may view the status and parameters of the hot tub detected by the remote hot tub control system.

Advancing from step 406 to step 408, the method 400 may include inputting a command to execute the draining and filling cycle of the hot tub. The command may be input via the input device. Upon receiving the user command to execute the draining and filling cycle of the hot tub, the controller may be configured to command the output valve to open and command the water pump to pump the used water out of the hot tub through the drain line via the output valve.

As described above, the controller may receive a first signal from a signal source indicating that the hot tub has been drained of the used water. Upon receiving the first signal, the controller may be configured to command the output valve to close, command the water pump to stop pumping, and command the input valve to open to permit the fresh water to enter the hot tub via the fill line. The controller may receive a second signal from the signal source indicating that the hot tub has been filled with fresh water. In response to receiving the second signal S, the controller may be configured to command the input valve to close.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A remote hot tub control system, comprising:

a hot tub having a drain line including an output valve configured to control an egress of used water from the hot tub, a water pump configured to pump water out of the hot tub via the drain line, a fill line including an input valve configured to control an ingress of fresh water to the hot tub, and a safety switch configured to detect a state of a cover of the hot tub;

a controller electronically connected to the output valve, water pump, input valve, and safety switch, the controller being configured to execute a draining and filling cycle of the hot tub; and an input device in communication with the controller and configured to receive user commands, wherein upon receiving a user command at the input device to execute the draining and filling cycle of the hot tub, the controller is configured to:

command the output valve to open and command the water pump to pump the used water out of the hot tub via the output valve, receive a first signal from a signal source indicating that the hot tub has been drained of the used water, and in response thereto, command the output valve to close, command the water pump to stop pumping, and command the input valve to open to permit the fresh water to enter the hot tub, and receive a second signal from the signal source indicating that the hot tub has been filled, and in response thereto, command the input valve to close;

the safety switch is a two-part switch having a first part attached to the hot tub and a second part attached to the cover of the hot tub; and upon receiving a safety signal from the safety switch indicating that the cover is in an open state during the draining and filling cycle, the controller is configured to pause execution of the draining and filling cycle of the hot tub.

2. The remote hot tub control system of claim 1, wherein the signal source is a water level sensor electronically coupled to the controller, the water level sensor being configured to detect a water level of the hot tub and output the first signal and the second signal, the controller transmits a command to close the output valve upon receiving the first signal from the water level sensor indicating that the hot tub has been drained of the used water, and the controller transmits a command to close the input valve upon receiving the second signal from the water level sensor indicating that the hot tub has been filled with the fresh water.

3. The remote hot tub control system of claim 1, wherein the signal source is a timer included in the controller, the timer being configured to measure a predetermined drain time and a predetermined fill time and output the first signal and the second signal, the controller transmits a command to close the output valve upon receiving the first signal from the timer indicating that the predetermined drain time has elapsed, and the controller transmits a command to close the input valve upon receiving the second signal from the timer indicating that the predetermined fill time has elapsed.

4. The remote hot tub control system of claim 1, further comprising:

at least one water quality sensor electronically coupled to the controller, the at least one water quality sensor being configured to detect a condition of water in the hot tub and transmit a quality signal to the controller indicating the condition of the water.

5. The remote hot tub control system of claim 1, further comprising:

a water temperature sensor electronically coupled to the controller, the water temperature sensor being configured to detect a water temperature of water in the hot tub and transmit a water temperature signal to the controller indicating the water temperature.

6. The remote hot tub control system of claim 1, further comprising:

a temperature sensor arranged on a heating coil of the hot tub and configured to transmit a coil temperature signal to the controller when the heating coil is active and heating fresh water after the hot tub has been filled.

7. The remote hot tub control system of claim 1, further comprising:

at least one additive pump configured to pump at least one additive into the fresh water in the hot tub under the control of the controller.

8. The remote hot tub control system of claim 1, wherein upon receiving the command to execute the draining and filling cycle of the hot tub, the controller is configured to interrupt a flow of electricity to a native hot tub power supply.

9. The remote hot tub control system of claim 1, wherein upon receiving the second signal indicating that the hot tub has been filled, the controller is configured to restore a flow of electricity to a native hot tub power supply of the hot tub.

10. A method for using a remote hot tub control system with a hot tub connected to a drain line having an output valve configured to control an egress of used water from the hot tub, a water pump configured to pump water out of the hot tub via the drain line, and a fill line having an input valve configured to control an ingress of fresh water to the hot tub, the method comprising:

connecting a controller to a hot tub;

configuring the controller to execute a draining and filling cycle of the hot tub;

electronically coupling an input device to the controller, the input device being configured to receive user commands;

inputting, via the input device, a command to execute the draining and filling cycle of the hot tub; and installing on the hot tub a safety switch electronically coupled to the controller, the safety switch being configured to detect a state of a cover of the hot tub and send a safety signal to the controller when the cover is in an open state, wherein upon receiving a user command at the input device to execute the draining and filling cycle of the hot tub, the controller is configured to:

command the output valve to open and command the water pump to pump the used water out of the hot tub via the output valve, receive a first signal from a signal source indicating that the hot tub has been drained of the used water, and in response thereto, command the output valve to close, command the water pump to stop pumping, and command the input valve to open to permit the fresh water to enter the hot tub, and receive a second signal from the signal source indicating that the hot tub has been filled, and in response thereto, command the input valve to close;

the safety switch is a two-part switch having a first part attached to the hot tub and a second part attached to the cover of the hot tub; and upon receiving the safety signal indicating that the cover is in the open state during the draining and filling cycle, the controller is configured to pause execution of the draining and filling cycle of the hot tub.

11. The method of claim 10, the method further comprising:

placing in the hot tub a water level sensor electronically coupled to the controller, the water level sensor being configured to detect a water level of the hot tub and output the first signal and the second signal, wherein the controller transmits a command to close the output valve upon receiving the first signal from the water level sensor indicating that the hot tub has been drained of the used water, and the controller transmits a command to close the input valve upon receiving the second signal from the water level sensor indicating that the hot tub has been filled with the fresh water.

12. The method of claim 10, the method further comprising:

including in the controller a timer configured to measure a predetermined drain time and a predetermined fill time and output the first signal and the second signal, wherein the controller transmits a command to close the output valve upon receiving the first signal from the timer indicating that the predetermined drain time has elapsed, and the controller transmits a command to close the input valve upon receiving the second signal from the timer indicating that the predetermined fill time has elapsed.

13. The method of claim 10, the method further comprising:

placing in the hot tub at least one water quality sensor coupled to the controller, the at least one water quality sensor being configured to detect a condition of water in the hot tub and transmit a quality signal to the controller indicating the condition of the water.

14. The method of claim 10, the method further comprising:

placing in the hot tub a water temperature sensor coupled to the controller, the water temperature sensor being configured to detect a water temperature of water in the hot tub and transmit a water temperature signal to the controller indicating the water temperature.

15. The method of claim 10, the method further comprising:

arranging on a heating coil of the hot tub a temperature sensor configured to transmit a coil temperature signal to the controller when the heating coil is active and heating fresh water after the hot tub has been filled.

16. The method of claim 10, the method further comprising:

installing in the hot tub at least one additive pump configured to pump at least one additive into the fresh water in the hot tub under the control of the controller.

17. The method of claim 10, the method further comprising:

configuring the controller to interrupt a flow of electricity to a native hot tub power supply in response to receiving the command to execute the draining and filling cycle of the hot tub; and configuring the controller to restore a flow of electricity to a native hot tub power supply of the hot tub in response to receiving the second signal indicating that the hot tub has been filled.

18. A remote hot tub control system, comprising:

a plurality of hot tubs, each hot tub of the plurality of hot tubs having a respective drain line including an output valve configured to control an egress of used water from the hot tub, a respective water pump configured to pump water out of the hot tub via the drain line, a respective fill line including an input valve configured to control an ingress of fresh water to the hot tub, and a respective safety switch configured to detect a state of a cover of the hot tub;

an input device configured to receive user commands; and a plurality of controllers in communication with the input device, each controller of the plurality of controllers being electronically connected to the output valve, water pump, input valve, and safety switch of a respective hot tub of the plurality of hot tubs, wherein upon receiving a user command at the input device to execute a draining and filling cycle of the hot tub to which it is connected, each controller is configured to:

command the output valve to open and command the water pump to pump the used water out of the hot tub via the output valve, receive a first signal from a signal source indicating that the hot tub has been drained of the used water, and in response thereto, command the output valve to close, command the water pump to stop pumping, and command the input valve to open to permit the fresh water to enter the hot tub, and receive a second signal from the signal source indicating that the hot tub has been filled, and in response thereto, command the input valve to close;

the safety switch is a two-part switch having a first part attached to the hot tub and a second part attached to the cover of the hot tub; and upon receiving a safety signal from the safety switch indicating that the cover of the hot tub to which it is connected is in an open state during the draining and filling cycle, each controller is configured to pause execution of the draining and filling cycle of the hot tub.

* * * * *